United States Patent [19]

Dowell

[11] 4,055,236

[45] Oct. 25, 1977

[54] DISC BRAKE WITH AN ANNULAR METAL FRAME HOLDING PART-CIRCULAR PADS

[75] Inventor: Frederick Sidney Dowell, Coventry, England

[73] Assignee: Dunlop Limited, London, England

[21] Appl. No.: 682,768

[22] Filed: May 3, 1976

[30] Foreign Application Priority Data

May 10, 1975 United Kingdom ............... 19755/75

[51] Int. Cl.² ........................................... F16D 65/12
[52] U.S. Cl. .............................. 188/73.2; 188/218 XL; 192/107 R
[58] Field of Search ............. 188/18 A, 218 XL, 73.2, 188/73.1, 73.6; 192/107 R

[56] References Cited

U.S. PATENT DOCUMENTS

| | | | |
|---|---|---|---|
| 2,453,811 | 11/1948 | Pennington | 188/218 XL |
| 2,708,492 | 5/1955 | Helsten | 188/218 XL |
| 2,986,252 | 5/1961 | Dubois | 188/218 XL X |
| 3,403,759 | 10/1968 | Holcomb, Jr. | 192/107 R |
| 3,412,836 | 11/1968 | Wilmer | 188/218 XL X |

FOREIGN PATENT DOCUMENTS 1,364,743 8/1974 United Kingdom .......... 188/218 XL

Primary Examiner—Trygve M. Blix
Assistant Examiner—Douglas C. Butler
Attorney, Agent, or Firm—Stevens, Davis, Miller & Mosher

[57] ABSTRACT

An annular brake disc takes the form of a metal frame having circumferentially-distributed, part-circular apertures in which part-circular pads of high heat-absorption material are inserted. Chordal gaps of the apertures open radially of the frame and through these the pads can be inserted and then rotated into a final position where they are held by a dowel. In arrangements in which the part-circular apertures intersect each pad is cut away on one side to receive the adjacent pad except one which is cut away on both sides and another which is not cut away but which is the only pad held in its final position by a dowel.

12 Claims, 8 Drawing Figures

DISC BRAKE WITH AN ANNULAR METAL FRAME HOLDING PART-CIRCULAR PADS

The present invention relates to a brake disc for a multi-plate disc brake of the kind in which a plurality of annular stator discs are interleaved with a plurality of annular rotor discs, the discs having keys at one of their respective peripheries whereby the stators are engaged with a stationary torque tube while the rotors are rotatable with the wheel. Thrust-applying means at one end of the disc pack is used frictionally to engage the rotors and stators when the brake is applied.

In the use of such brakes a major problem is the heat generated when the brake is applied, particularly in the case of aircraft, train and ships' transmission brakes, and therefore materials of high specific heat such as Beryllium and structural carbon have been used. However, these material are relatively fragile and brittle and the production of unitary bodies of large size is costly. The practice has therefore been adopted of mounting pads of the brittle material on a supporting annular frame of metal so that the pads act either as friction members or as heat sink members or both as friction members and heat sink members.

Due to the friable nature of the friction or heat sink pads their mounting on a metal frame presents difficulties. Abutment along a straight edge between the metal and the more brittle material is undesirable and it is also undesirable to aperture the pads to receive securing pins, dowels, or the like.

An object of the present invention is to provide a solution to the problem of mounting friction and/or heat sink members on a metal frame.

According to the present invention there is provided a brake disc comprising an annular metal frame having means defining a plurality of circumferentially distributed channels of segmented-circular shape, each having a gap corresponding to a chord of the circle which opens radially of the frame, and a plurality of friction and/or heat sink members of a material more brittle and of higher specific heat than the frame, each member being shaped at least approximately as a segmented circle and fitting an associated one of the channels to be rotatable therein, the width of the member on a diametral line bisecting its chordal edge being less than the width of the gap of the associated channel whereby the member can be inserted in or removed from the channel through the gap when the chordal edge of the member extends radially of the frame and there being additionally provided releasable means for preventing rotation of each member in the associated channel when the member is in an operative position with its chordal edge extending generally circumferentially of the frame.

The "chordal edge" of each member may be a straight line or a curve of greater radius than the circle on which the rest of the periphery of the member lies. Preferably the "chordal edge" lies on a curve which is of the same diameter as the frame so that when each member is in its operative position its chordal edge is continuous with the adjacent frame periphery.

The channel defining means of the frame may take the form of an undercut opening or recess in the frame which is adapted to co-operate with a chamfered edge of the associated member whereby in its operative position the member is restrained against displacement axially of the frame. In a preferred construction the means defining each channel comprises a part-circular opening in the frame bounded by an undercut recess opening to each axial face of the frame. The associated member may be a unitary body having a central portion which fits the opening and chamfered axial end portion which fit the respective recesses or the central and axial end portions of the member may be separate elements of the same or different material which are separately insertable into the opening and recesses.

The releasable means for preventing rotation of each member in the associated channel may take the form of a pin, dowel or the like penetrating the frame in a direction parallel with its axis and engaging in a recess formed in the part-circular portion of the periphery of an associated one of the members.

In one construction in accordance with the invention each member is located in a part-circular channel which is spaced circumferentially of the frame from the next adjacent channels and in this embodiment at least one removable pin of dowel is associated with each channel and the member located therein. In other embodiments of the invention, however, the channels are positioned on the frame so that the circles on which they lie intersect (the distance between the centres of the circles on which two adjacent channels lie being less than the diameter of each circle) and the part-circular portion of the periphery of each member is cut away to receive the portion of an adjacent member which intersects the circle on which it lies.

By this arrangement each member is prevented from rotating by a next adjacent member but the members can be inserted in sequence around the circumference of the frame by rotating each toward the cut-away portion of a next one already mounted.

A problem is here presented in inserting the last of the members into the frame if all were of the same shape. To overcome this problem one (only) of the members has portions cut out of its opposite sides so that in its operative position it does not overlap either of the circles on which the adjacent, intersecting channels lie. Another one (only) of the members has a full part-circular periphery so that in the operative position it will extend into both of the next adjacent channels. A dowel or pin penetrating the frame and located in a recess in the periphery of this member is necessary to prevent its rotation when mounted.

According to a third embodiment of the invention, which is otherwise similar to the second embodiment described in the preceding paragraph, the channels of the frame open at their gaps alternately to the outer or to the inner periphery of the frame in sequence around the circumference of the frame.

Preferred embodiments of the invention will now be described with reference to the accompanying drawings, in which.

Figure 6:
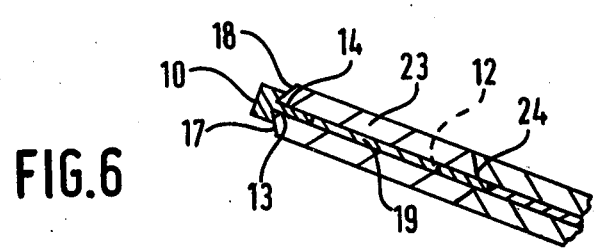
FIG. 6 is a cross-sectional view taken on the line VI—VI of FIG. 5.
Figure 5:
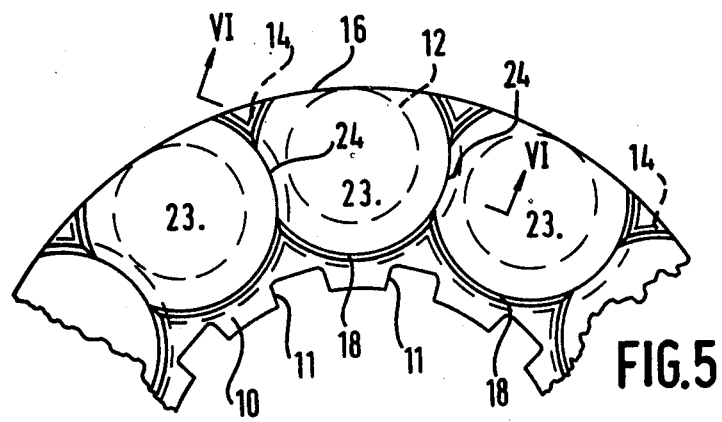
FIG. 5 is a view similar to FIG. 1 of a second embodiment of the invention.
Figure 7:
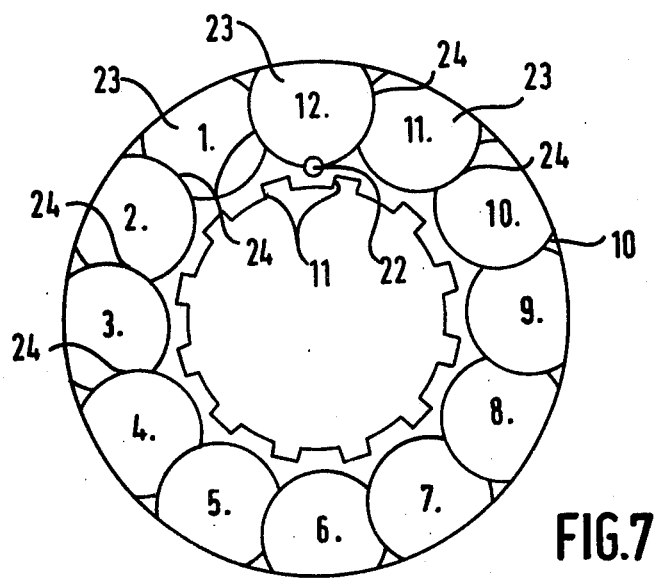
Figure 8:
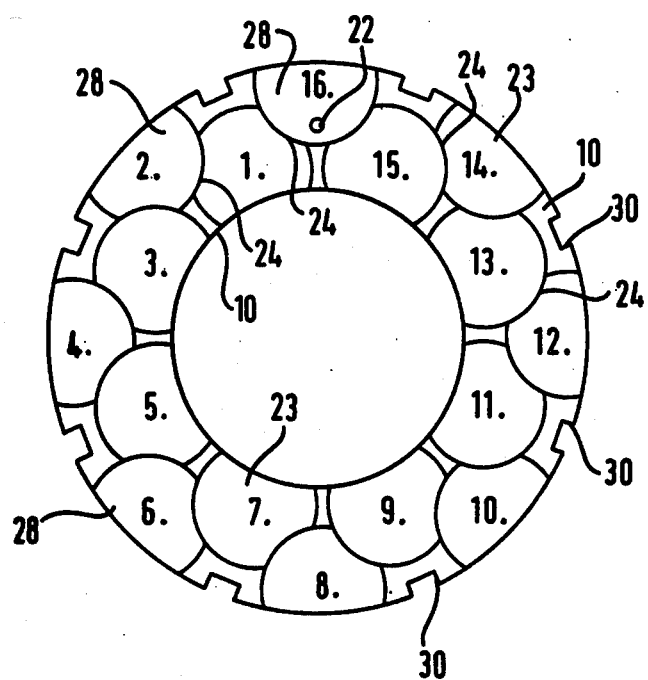

FIG. 7 diagrammatically illustrates an entire brake disc in accordance with FIGS. 5 and 6; and FIG. 8 illustrates a third embodiment of the invention.

Figure 2:
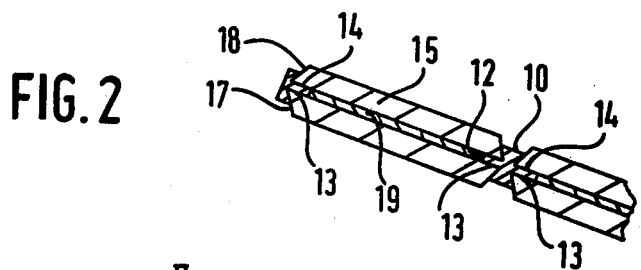
FIG. 2 is a cross-sectional view taken on the line II—II of FIG. 1.
Figure 1:
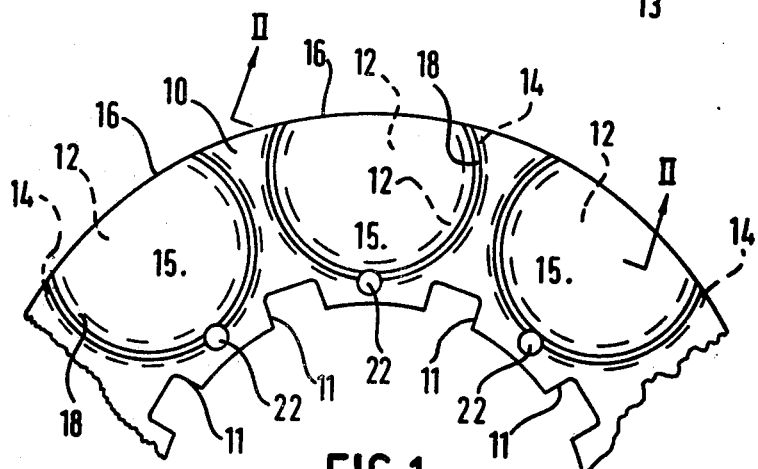
FIG. 1 is a partial front elevational view of a brake disc in accordance with the invention.

The brake disc illustrated in FIGS. 1 and 2 comprises an annular metal frame 10 the inner periphery of which is formed with notches 11 to engage splines or teeth on a torque tube (not shown). The brake disc is to be interleaved with rotor discs having notches in their outer peripheries to engage a wheel and with other stator discs to form a disc pack compressible by thrust-applying means at one end of the pack so that frictional engagement between the stators and rotors will stop the wheel.

The frame 10 is formed with a plurality of part-circular apertures 12 in circumferentially-spaced relation around the frame, each aperture 12 being bounded at both axial faces of the frame 10 by under-cut recesses 13 and 14 which lie on circles of greater diameter than the apertures 12. Each recess 13 and 14 thus presents axially of the frame a channel having the shape of a segmented circle.

Located in each aperture 12 is a carbon friction pad 15 which is also part-circular in shape but the chordal edge 16 of which is a curve of the same diameter as the outer periphery of the frame 10. Except at the edge 16 the part-circular periphery of the pad 15 is chamfered at 17 and 18 (see FIG. 2), the chamfered edges 17 and 18 being shaped to fit in the under cut recesses 13 and 14, respectively, so that the pad 15 is restrained against movement axially of the frame 10. In addition a central portion 19 of the pad 15 is of reduced diameter to locate in the aperture 12 and the axial end portions of the pad 15 extend against the frame on either side of the aperture 12 to prevent movement of the pad 15 axially of the frame 10.

It will be appreciated that alternatively the central portion 19 of the pad 15 could be separate from its axial end portions, the central and axial portions of the pad 15 being assembled in the aperture 12 and recesses 13 and 14 in separate operations. If this is the case the central portion 19 of the pad 15 may be of a different material from its axial end portions. For example the central portion 19 might be of Beryllium providing a heat sink for the pad and the axial end portions of carbon providing friction surfaces for the pad.

Figures 3, 4:
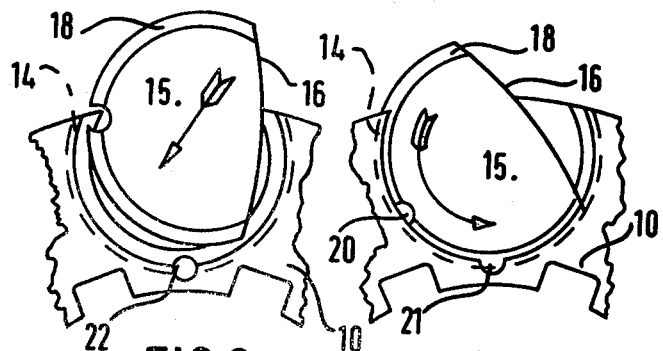
FIGS. 3 and 4 are views of one of the channels illustrated in FIG. 1 and show the way in which a friction pad is positioned in the channel.

In the position illustrated in FIG. 1 each pad 15 is restrained against movement radially of the frame 10 because the diameter of the circle on which the pad lies is greater than the gap between the opposite ends of the recesses 13 and 14 whereby the aperture 12 opens to the outer periphery of the frame 10. So that each pad 15 is removable from the associated channel in the frame the maximum width of the pad on a diametral line which bisects its chordal edge 16 is less than the gap between the opposite ends of the recesses 13 and 14. FIGS. 3 and 4 illustrate how one of the pads 15 is assembled in the associated part-circular channel defined by an aperture 12 and the adjacent recesses 13 and 14. With the chordal edge 16 of the pad generally radial to the frame 10 the pad is introduced into the gap between the opposite ends of the recesses 13 and 14 in the direction indicated by the arrow in FIG. 3. The pad 15 is then rotated as indicated by the arrow in FIG. 4 until it reaches the operative position as illustrated in FIG. 1. In this position a recess 20 in the periphery of the pad 15 comes into register with a recess 21 which penetrates the frame 10 axially across the recesses 13 and 14. A pin or dowel 22 can then be passed through the registered recesses 20 and 21 to restrain the pad 15 from rotation in the frame 10 during use of the brake disc. If it is desired to remove a pad 15 from its associated channel the associated pin 22 is removed, the pad is rotated counter to the direction of the arrow in FIG. 4 to the position shown in FIG. 3 and then removed through the channel gap.

FIGS. 5 and 6 illustrate a second embodiment of the invention which is similar to the embodiment of FIGS. 1 to 4, like parts being given like references. In this embodiment, however, the channels defined by the part-circular recesses 13 and 14 lie on circles which intersect each with the two next adjacent. Pads 23 each have a chordal edge 16 and axial end portions engaged in the recesses 13 and 14 which are delimited by chamfered edges 17 and 18 lying on the circle of the channel except that the pad 23 is cut away at 24 where it is intersected by one (only) of the adjacent pads 23. As seen in FIG. 6 the cut-away portion of the pad 23 is undercut to recieve the chamfered edge of an adjacent pad 23.

By this arrangement in spite of the intersection of the circles on which the pads 23 lie they may still be assembled in the manner described in connection with FIGS. 3 and 4. The pads 23 are inserted in the frame 10 in sequence around its circumference, each being rotated to a position where its cut-away portion 24 will permit the insertion of an adjacent pad 23.

FIG. 7 diagrammatically illustrates an entire brake disc in accordance with FIGS. 5 and 6. It will be appreciated from FIG. 7 that in order to inert the last pad, numbered 12 on the drawing, there must be cut-away portions on both of the pads numbered 1 and 11 which are to be on opposite sides of the pad 12 in the finished disc. For this reason the first pad assembled in the frame and numbered 1 has cut-away areas 24 on both sides, one to enable insertion of the second pad 2 to be assembled and the other to enable insertion of the final pad 12. A pin 22 is provided only in association with the final pad 12.

The third embodiment of the invention illustrated in FIG. 8 is generally similar to that of FIGS. 5 to 7 except that the channels for the reception of the pads open alternately to the inner periphery of the frame 10 and to its outer periphery. The configuration of the pads 28 used in this embodiment is generally similar to that of the pads 23 except that the cut-away area 24 one each pad 28 is displaced around the part-circular periphery of the pad. In this embodiment the same considerations apply as in the second embodiment, i.e. the first pad 28 inserted and numbered 1 in the drawing has two cut-away areas 24 around its periphery and the last pad to be inserted and numbered 16 in the drawing has no cut-away areas 24. A removable pin or dowel 22 penetrates the final pad 16 and the frame 10.

It will be seen that by the arrangement of FIG. 8 the frame can be made to include a greater surface area of the pad material and the pad material can be made to extend between the outer and inner peripheries of the frame. The arrangement of FIG. 7 is suitable for a stator disc with notches 11 in its inner periphery and the arrangement of FIG. 8 is suitable for a rotor disc with notches 30 in its outer periphery.

Having now described my invention, what I claim is:

1. A brake disc comprising an annular metal frame having means defining a plurality of circumferentially distributed channels of segmented-circular shape, each having a gap corresponding to a chord of the circle, each said gap opening radially of the frame, and a plurality of friction members of a material more brittle and of higher specific heat than the frame, each member being shaped at least approximately as a segmented circle and fitting into an associated one of the channels by insertion through the gap and being subsequently rotated while in the channel; the width of the member on a diametral line disecting its chordal edge being less than the width of the gap of the associated channel whereby the member can be inserted in or removed from the channel through the gap when the chordal edge of the member extend radially of the frame; releasable means for preventing rotation of the member after being positioned in its associated channel so that when the member is in an operative position with its chordal edge extending generally circumferentially of the frame it is held in place.

2. A brake disc as claimed in claim 1, wherein said chordal edge of each member lies on a straight line.

3. A brake disc as claimed in claim 1, wherein said chordal edge of each member lies on a curve which is of the same diameter as the frame, the arrangement being such that when each member is in its operative position the chordal edge is continuous with the adjacent frame periphery.

4. A brake disc as claimed in claim 1, wherein the channel defining means of the frame takes the form of an undercut recess in the frame which is adapted to co-operate with a chamfered edge of the associated member whereby in its operative position the member is restrained against displacement axially of the frame.

5. A brake disc as claimed in claim 1 wherein the releasable means for preventing rotation of each member in the associated channel takes the form of a dowel penetrating the frame in a direction parallel with its axis and engaging in a recess formed in the part-circular portion of the periphery of an associated one of the members.

6. A brake disc as claimed in claim 1, wherein each member is located in a part-circular channel which is spaced circumferentially of the frame from the next adjacent channels.

7. A brake disc comprising an annular metal frame having means defining a plurality of circumferentially distributed channels shaped as part-circular openings in the outer periphery of the frame and bounded by an undercut recess opening to each axial face of the frame, each channel having a gap corresponding to a chord of the circle, each said gap opening radially of the frame, and a plurality of friction members of a material more brittle and of higher specific heat than the frame, each member being shaped at least approximately as a segmented circle and fitting into an associated one of the channels by insertion through the gap and being subsequently rotated while in the channel; the width of the member on a diametral line bisecting its chordal edge being less than the width of the gap of the associted channel whereby the member can be inserted in or removed from the channel through the gap when the chordal edge of the member extends radially of the frame; releasable means for preventing rotation of the member after being positioned in its associated channel so that when the member is in an operative position with its chordal edge extending generally circumferentially of the frame it is held in place by said undercut recess opening.

8. A brake disc as claimed in claim 7, wherein the associated member is a unitary body having a central portion which fits the opening and chamfered axial end portion which fit the respective recesses.

9. A brake disc as claimed in claim 7, wherein the associated member is a composite member comprising separate central and axial end portions inserted respectively into the opening and into the recess, the central portion being of a different material from the axial end portions.

10. A brake disc comprising an annular metal frame having means defining a plurality of circumferentially distributed channels of segmented-circular shape, each having a gap corresponding to a chord of the circle which opens radially of the frame, and a plurality of friction members of a material more brittle and of higher specific heat than the frame, each member being shaped at least approximately as a segmented circle and fitting an associated one of the channels to be rotatable therein, the width of the member on a diametral line bisecting its chordal edge being less than the width of the gap of the associated channel whereby the member can be inserted in or removed from the channel through the gap when the chordal edge of the member extends radially of the frame and there being additionally provided releasable means for preventing rotation of each member in the associated channel when the member is in an operative position with its chordal edge extending generally circumferentially of the frame, and wherein the channels are positioned on the frame so that the circles on which they lie intersect, the distance between the centres of the circles on which two adjacent channels lie being less than the diameter of each circle, and the part-circular portion of the periphery of each member is cut away to receive the portion of an adjacent member which intersects the circle on which it lies, the arrangement being such that each member is prevented from rotating by a next adjacent member but the members can be inserted in sequence around the circumference of the frame by rotating each toward the cut-away portion of a next one already mounted, one only of the members having portions cut out of its opposite sides so that in its operative position it does not overlap either of the circles on which the adjacent, intersecting channels like, while another one only of the members has a full part-circular periphery so that in the operative position it will extend into both of the next adjacent channels.

11. A brake disc as claimed in claim 10, wherein a dowel is provided penetrating the frame and located in a recess in the periphery of the member having a full-part-circular periphery to prevent its rotation when mounted.

12. A brake disc as claimed in claim 10 wherein the channels of the frame open at their gaps alternately to the outer or to the inner periphery of the frame in sequence around the circumference of the frame.

* * * * *